United States Patent

Parker

[15] 3,642,140

[45] Feb. 15, 1972

[54] OIL RECOVERY AND CLEANUP SYSTEM

[72] Inventor: James H. Parker, P.O. Box 1652, Norfolk, Va. 23501

[22] Filed: Mar. 23, 1970

[21] Appl. No.: 21,810

[52] U.S. Cl. .....................................210/242, 210/DIG. 21
[51] Int. Cl. .........................................................C02b 9/02
[58] Field of Search....................210/523, 83, 242, 513, 169, 210/470, 473; 61/5

[56] References Cited

UNITED STATES PATENTS

| | | | |
|---|---|---|---|
| 1,107,391 | 8/1914 | Welch.....................................210/242 |
| 2,579,304 | 12/1951 | Crawford............................210/169 X |
| 2,661,094 | 12/1953 | Stewart..................................210/242 |
| 2,725,356 | 11/1955 | Lombardi..............................210/169 |
| 2,891,672 | 6/1959 | Veld et al. .............................210/242 |
| 1,847,551 | 3/1932 | Brayman et al. ..........................61/5 X |

FOREIGN PATENTS OR APPLICATIONS 911,963  12/1962  Great Britain.........................210/169

Primary Examiner—Reuben Friedman
Assistant Examiner—T. A. Granger
Attorney—James F. Jones

[57] ABSTRACT

An oil recovery unit is provided for recovery of oil floating on the surface of the water in which the recovery unit has a plurality of float elements of decreasing diameter from top to bottom associated with one another to define a floating frame, oil collection means centrally positioned within the defined floating frame with the top surface of the collection chamber means being below the top surface of the float element, and oil drawoff means associated at one end with the oil collection chamber means and the opposite end thereof connected to pump means remotely located from the recovery end for drawing off the collected oil.

An oil processing unit is provided for use in association with the recovery unit in which the oil mixture collected by the recovery unit is passed continuously into a collection chamber wherein the oil mixture is permitted to settle into an oil phase and a water phase, with the oil phase being passed to a collection zone for subsequent drawoff and the water phase being passed at low velocity continuously through at least two other processing stages to remove entrained oil and to discharge the water back to where it came, or otherwise disposed of.

18 Claims, 11 Drawing Figures

PATENTED FEB 15 1972

OIL RECOVERY AND CLEANUP SYSTEM

BACKGROUND OF THE INVENTION

1. Field of the Invention

The problem of water pollution from liquid petroleum products and like fluids having a density less than that of either fresh water or sea water has become a major concern throughout the world in recent years. Such pollution of the water results from the handling of the oil or other fluids either in transporting or storage on or near the water, which oftentimes results in accidental spillage or leakage of oil onto the water surface, as well as from the use and discharge of the fluids into the water. When such spillage, leakage, or discharge occurs, the oil must be removed as promptly as possible since the oil will tend to spread on the surface of the water and will be carried by the current of the water over great areas. The prolonged presence of these floating petroleum products and like fluids on the water creates extremely hazardous conditions since it will deleteriously affect all forms of marine life, is quite harmful to aquatic birds utilizing the water, presents a fire hazard, is malodorous to the surrounding area, and prevents the use of beach and like land areas adjacent the polluted water. While major oil spillage of the magnitude of the Torrey Canyon accident has been given considerable publicity, the day to day water pollution presents the greater problem and is caused by leakage and spillage of the oil from shore facilities adjacent the water, vessels coming into or departing from such facilities, or facilities located just off shore. The containment and removal of oil and the like from the water in the day to day occurrence is the type of situation that is creating the major problems of pollution and is the one requiring a prompt solution or minimization of damages.

2. Description of the Prior Art

In endeavoring to solve this serious and increasing problem of water pollution by floating oil and the like, several procedures and techniques have been heretofore proposed and employed. For example, several forms of barrier units have been proposed in which floating units are placed on the water to form a barrier fence around the contaminated area which will confine the spilt oil in a relatively small area. Some of these prior units have included barrier units having means which will also drawoff the confined oil from the surface of the water. An example of such barrier units having oil drawoff means is shown in U.S. Letters Pat. No. 3,369,664 issued to Paul C. Dahan and U.S. Letters Pat. No. 3,221,884 issued to Jacques Muller. Such barrier and recovery units are quite large and cumbersome and present major problems of storage transporting and handling such that they are of only real utility when great quantities of oil have been spilled over a very large area and the recovery will require considerable time.

Other forms of removal systems that have been proposed are based on the concept of using simple floating barriers which will function merely to confine the oil in a single area and to use separate equipment to suck or drawoff the oil from the surface of the water. These types of removal systems are receiving greater interest since they can be employed equally as well on large areas of spillage as well as small areas and are more efficient in operation and cheaper in cost. There have been several forms of oil removal units proposed for use to pick up oil from a barrier confined area. Examples of such oil pickup units that have heretofore been contemplated are shown in U.S. Letters Pat. No. 2,876,903 issued to Harry W. Lee, U.S. Letters Pat. No. 2,891,672 issued to Cornelis in't Veld et al., and U.S. Letters Pat. No. 2,330,508 issued to Eli S. McColl. Such units as exemplified by these patents have, in general, been quite bulky to handle and to operate, have possessed problems of stability during use, have had a low degree of oil removal and recovery, have possessed operational and safety problems due to design, as well as other like disadvantages which have minimized their general adoption and use.

Other means of removal or dispersal of oil floating on the surface of water have also been proposed and employed. For example, chemical treatment of the contaminated area has been proposed in an effort to place the oil into a state which will permit its easy dispersion throughout the body of water on which it was floating. This type of chemical treatment is not desired since it does not effect a removal of the oil. Another form of removal that has been tried heretofore has been the spreading of hay onto the polluted area to effect an absorption of the oil, followed by the collection of the oil-soaked hay and its subsequent burning. This procedure has met with little success since it is quite difficult to collect the soaked hay efficiently and to find an area where it may be burned without creating a serious problem of air pollution. Still another proposal that has been tried is the simple burning of the oil, which also presents a problem of air pollution. All of these other prior proposals have met with limited success since, in addition to not effecting a substantial removal of the oil, such methods have created other problems of handling contaminated products, air pollution, and the like.

In summation, considerable activity has been and is being devoted to the development of apparatus and systems to effect the removal and recovery of oil and like fluids from the surface of bodies of water. While there have been a wide variety of removal means proposed and tried, there has not as yet been developed a simple, efficient and stable removal unit or system which will permit the ready removal and recovery of all forms of oil from the surface of any type of water in a safe, efficient and economical manner.

SUMMARY OF THE INVENTION

In accordance with the present invention, there is provided a recovery unit for use with areas of water containing oil on the surface thereof which will draw off the oil from the surface of the water easily and thoroughly and in a highly efficient manner. The recovery unit made in accordance with the present invention may be employed equally as well on large bodies of contaminated water or on smaller contaminated areas, each of which will have confining barrier means surrounding the contaminated area. Moreover, the recovery unit made in accordance with the present invention may be employed to recover spilled oil in a highly efficient and economical manner from small contaminated areas of water, or from large areas of water containing great amounts of oil on the surface of the water.

The recovery unit made in accordance with the present invention is in the form of an assembly of float elements disposed in a manner such that the unit will float on the surface of the contaminated water area in a highly stable manner. The ring-shaped means are secured to the float elements to bring them into the desired relationship with one another such that oil collection means may be centrally disposed within the area formed by the float elements and will rest at or just below the water line enabling the oil floating on the surface of the water to pass thereinto. The association of the float elements along with other components will produce an extremely stable recovery unit under all conditions of use. Oil drawoff means are provided for the collection chamber to permit the continuous drawoff of oil as it is collected from the water surface.

The recovery of oil skimming unit made in accordance with the present invention is light in weight, compact in design and structure, easily transportable by air or any other means of transportation, and can be operated equally as well from the shore or from a floating craft. The recovery unit is of such construction and design that it is quite stable in use and will maintain a proper recovery position in most conditions of water turbulence. Another feature of the present invention is that the recovery unit is omnidirectional in operation and achieves a high rate of removal and recovery of oil from the surface of water in comparison with similar devices heretofore used. Furthermore, the recovery unit made in accordance with the present invention is far cheaper in cost than prior devices and is of such simplicity that a single operator can handle the unit quite easily. Moreover, the recovery unit made in accordance with the present invention is far safer to operate in a body of oil-contaminated water than prior devices, since the unit contains no moving parts, operating elements, engines, motors, or like power means. Such construction makes it possible to locate all power means which might ignite the oil at a point remote from the contaminated area.

Another feature of the present invention is the provision of a self-contained portable processing unit associated with the recovery unit which will receive the recovered oil-water mixture from the recovery unit, effect a stepwise separation of the oil and water into separate phases, and then subsequently discharge the water phase and retain the oil phase therein. The processing unit may be transported by tractor unit over the road in the conventional manner of a trailer unit, or may be placed on a water craft for offshore operation. The processing unit made in accordance with the present invention permits a continuous oil-water separation as the oil mixture is withdrawn from the contaminated area and may be employed with any type of oil to effect a high degree of separation in an efficient and inexpensive manner. The processing unit made in accordance with the present invention provides all necessary operating components to effect the operation of the recovery unit, thereby eliminating the need for any moving parts or operating components on the recovery unit, thereby providing a much safer operating unit in the area of the oil.

Broadly stated, the recovery unit made in accordance with the present invention comprises a plurality of float members spaced from one another in a generally circlelike or rectilinear configuration with the larger volume of each float member being uppermost, providing floats of decreasing or diminishing cross section or volume from top to bottom, circular deck means secured adjacent the top of each of said float members, oil collection chamber means positioned centrally within the confines of and below the top surface of said float members, bracing means secured to the top surface of said deck means and extending therearound in a laterally spaced, horizontally disposed, radial direction, stabilizing means in vertically spaced relationship below said top deck means, oil drawoff pipe means connected at the convergence area of and to said bracing means in substantially right angled relationship thereto with the lower end thereof extending into said collection chamber means, and the opposite end of said drawoff pipe means extending above said deck means, tube means connected to said pipe means for carrying off collected oil, and means for drawing off oil through said tube means.

DESCRIPTION OF SPECIFIC AND ILLUSTRATIVE EMBODIMENTS

Figure 1:
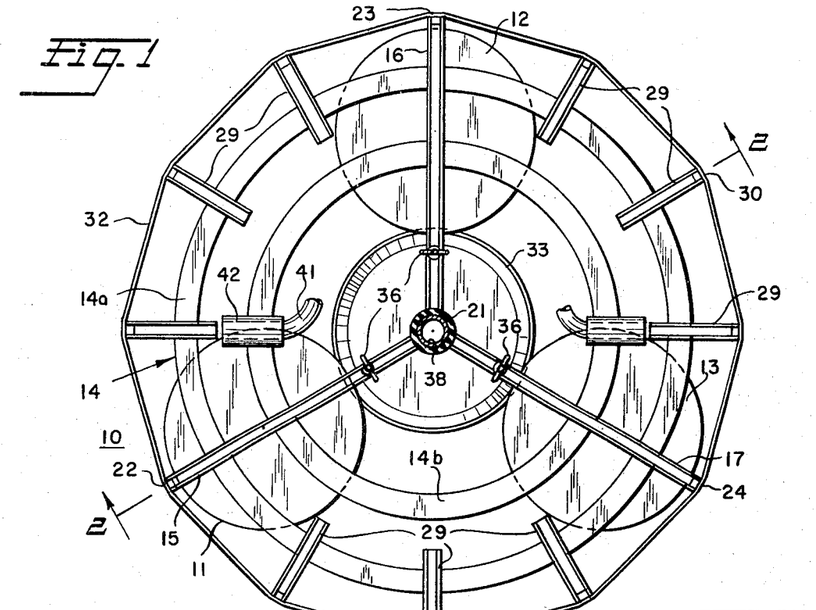
FIG. 1 is a top plan view of a recovery or oil skimming unit made in accordance with the present invention, with the oil recovery hose removed.
Figure 2:
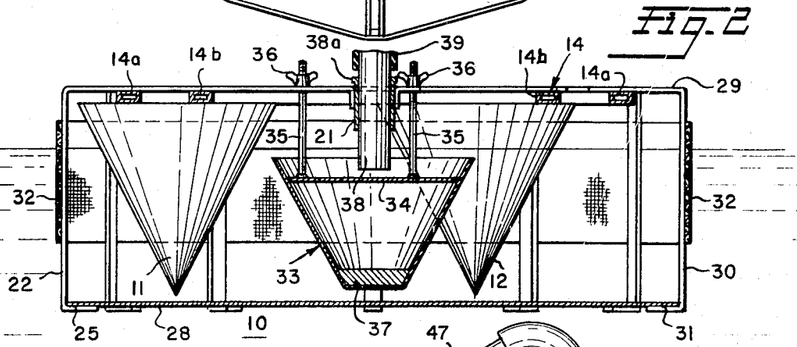
FIG. 2 is a cross-sectional view taken along lines 2—2 of FIG. 1.

Reference is now to be had to FIGS. 1 and 2 wherein an illustrative embodiment of an oil recovery or skimming unit made in accordance with the present invention and generally designated by reference numeral 10 is shown. The oil recovery unit 10, as illustrated, comprises three hollow float members 11, 12 and 13 made of any suitable material, such as, for example, light gauge metal, aluminum, reinforced plastic, or the like. Each of the float members 11, 12 and 13 is positioned in spaced relation with one another in a generally triangular relationship and is to be so constructed as to be airtight since these units function as the means to float the recovery unit 10 in the water. As illustrated, the float members 11, 12 and 13 are generally conical in configuration having a decreasing diameter from top to bottom, with the larger end of each being at the top and tapering downwardly, thus producing float members having variable displacement with respect to the liquid in which it will float. This particular configuration has been found highly advantageous since it will offset or compensate for varying proportions of oil, water and air that may be passing through the recovery unit, and particularly when passing through the tubular handle means.

From the foregoing it is seen, therefore, that the purpose of the variable volume configuration of each of the float members is to provide a variable displacement which reduces the amplitude of vertical motion resulting from variation in the amount of weight of oil, water and air going up the oil drawoff means thereby insuring vertical stability of the recovery unit 10. It has been found with this construction that forces tending to increase submergence of the unit 10 are countered by the increasing displacement of the conical shaped floats 11, 12 and 13. Conversely, any forces which will tend to decrease submergence are countered by the decreasing displacement of the rising conical shaped floats 11, 12 and 13.

While the conical float members 11, 12 and 13 have been shown as three in number, it is to be clearly understood that the precise number is illustrative in character only since any number of conical float members may be employed, depending upon the size of the recovery unit and which will still enable the recovery unit to function in a stable state. Moreover, while the floats 11, 12 and 13 are shown as being conical in shape, and this is the preferred and desired configuration, it is within the spirit and scope of the present invention to employ floats having any configuration that will have a variable volume from top to bottom so long as such floats will impart the desired stability to the recovery unit 10 in substantially the same manner.

Figures 3, 4, 5:
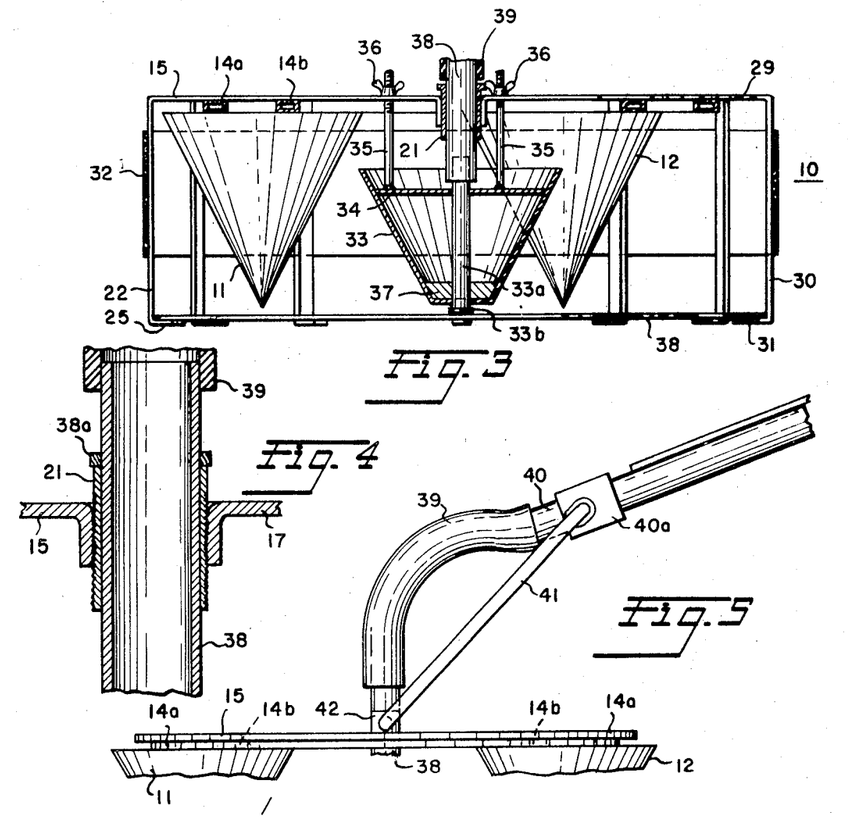
FIG. 3 is a cross-sectional view of a modified form of an oil skimming or recovery unit made in accordance with the present invention illustrating means to fluidize extremely heavy and viscous oil.
FIG. 4 is an enlarged fragmentary cross-sectional view illustrating one form of association of the oil drawoff pipe means with the frame means of the oil recovery unit made in accordance with the present invention.
FIG. 5 is a fragmentary side elevation illustrating one form of association of a flexible hose and tubular handle means that may be employed with the oil recovery unit made in accordance with the present invention.

Top deck circular means 14 made of any suitable material, such as, for example, fiberglassed plywood, plastic, aluminum, or other light gauged metal, is secured in any suitable manner, such as a nut and bolt assembly, threading, bonding, or the like, to the top surface of each of the float members 11, 12 and 13 and serves to retain the floats in fixed, spaced, triangular relationship to one another with the pointed nose of each float extending downwardly. The top deck means 14, as illustrated, consists of an outer metal ring 14a and an inner metal ring 14b inwardly spaced therefrom, each of such rings being rectilinear in cross section. It is to be clearly understood that the top deck means 14 may be made of any other material and in a different manner, such as, for example, a circular one piece ring made of fiberglassed plywood or the like. Main bracing arm members 15, 16 and 17 corresponding to one for each float member extend across and are secured to the top surface of the top deck ring member 14 at suitable points on the rings 14a and 14b above the corresponding float member. The main bracing arm members 15, 16 and 17 extend inwardly at one end and converge to a point substantially coinciding with the center point of the top deck ring member 14. The inner end of each of the top bracing arm members 15, 16 and 17 at their point of convergence is bent downwardly at right angles to one another, as shown in FIG. 3, forming vertically disposed flange portions which are secured by welding or the like to the outside surface of a centrally positioned, vertically disposed pipe collar 21.

The opposite end of each of the top bracing arm members 15, 16 and 17 extends beyond the outermost point of each of the floats 11, 12 and 13 and is bent downwardly at right angles forming outer vertical flange portions 22, 23 and 24, respectively, of a length greater than the vertical height of the floats 11, 12 and 13. The free end of each of the outer vertical flange portions 22, 23 and 24 is bent inwardly forming horizontally disposed bottom flange portions 25, 26 and 27, respectively, which are spaced below the bottom point of each of the float members 11, 12 and 13. A stabilizing disk member or deck member 28 made of any suitable material, such as, for example, thin gauge metal, fiberglassed plywood, wood, plastic, or the like, is secured by any suitable means, such as, for example, bolting or the like, to the top surface of each of the bottom flange portions 25, 26 and 27. The stabilizing disk member 28 may be of any desired configuration that will provide a large area to insure maximum vertical stability and also preferably, for reason of design, have a diameter substantially equal to the diameter between the vertical flange portions 22, and is preferably made from thin fiberglassed plywood. Similarly, the disk member 28 may be imperforate or may be apertured, through which other components may extend.

It is to be clearly understood that while top deck member 14 and a stabilizing disk member 28 have been shown as two elements vertically spaced from one another, it is within the spirit and scope of the present invention that the desired bracing and connection of the various components and the desired stabilization may be achieved by the use of a single disk or deck member disposed intermediate the top and bottom ends of the float members 11, 12 and 13. Moreover, it is also to be clearly understood that the stabilizing effect achieved by the disk member 28 may be obtained by the use of two or more disk members spaced intermediate the ends of the conical float members 11, 12 and 13, or below the float members, or above and below the bottom end of each of said float members.

The function of the stabilizing disk member or bottom deck 28 is to impart, in combination with the float members 11, 12 and 13 having variable displacement, the desired dampening effect to the recovery unit 10 and also minimize the tendency of the unit to bob when the unit is in operation. Moreover, the stabilizing disk member 28 in association with the conical float members 11, 12 and 13 produces a combination in which the disk member 28 and the conical float members 11, 12 and 13 simultaneously tend to resist vertical movement by reason of fluid weight in the oil drawoff means and instantly responds to the vertical movement of the water in larger waves. The arrangement thus insures that the recovery unit 10 will ride or float properly with and in respect to, and only to, any wave action or motion.

A plurality of secondary brackets 29 of substantially the same construction extend radially outwardly and completely around the top deck circular means 14 in equally spaced relationship, with the inner free end of each being secured to the top surface of the outer ring 14a of the top deck circular means, or, if desired, to both the inner or outer rings 14a and 14b. Each of the secondary brackets 29 has its opposite end extending outwardly from the top deck circular means 14 for a distance substantially equal to the distance of the top bracing arm members 15, 16 and 17, with the outermost end of each being bent downwardly at right angles forming a plurality of vertical flange portions 30 which extend completely around the top deck member 14 in laterally spaced relationship. The bottom free end of each of the secondary brackets 19 is bent inwardly forming bottom flange portions 31 which correspond to the bottom flange portions 25, 26 and 27 and also function to receive the stabilizing disk or bottom deck member 28 in secured relationship thereto in the same manner as to the flange portions 25, 26 and 27.

An encircling wire mesh strainer 32 is secured by any suitable fastening means, such as, for example, clamps or the like, against the outside surface of the vertical flange portions of the main bracing arms 15, 16 and 17 and the vertical flange portions 30 of each of the secondary brackets 29 under tension therewith. This construction produces a continuous strainer element 32 extending completely around the recovery unit 10 and will function to prevent debris and like foreign matter from entering the recovery unit 10, since if such material were permitted into the interior of the recovery unit, blockage of the oil withdrawal might well occur. The wire mesh strainer 32 is so positioned around the outside perimeter of the recovery unit 10 that the top edge of the strainer will rest above the oil level floating on the water thereby insuring that all oil to be recovered will pass interiorly into the recovery unit 10 through the mesh strainer 32. It is to be clearly understood that if there is no problem of debris, the wire mesh strainer will not be required. In many instances, it will be found that when extremely heavy or viscous oils are to be recovered, the strainer 32 should not have horizontal strands in the oil area since the oil will tend to collect therealong and cause a plugging of the strainer 32. In such a case, the strainer 32 will be connected to the top and bottom only by a horizontal strand with the remaining strands being vertically disposed. If light oil is to be recovered, a conventional smaller mesh strainer may be used or secured otherwise to the outside surface of the vertically formed strainer 32.

To provide means for collecting the oil, an oil collection chamber member 33 is positioned centrally within the area formed by the floats 11, 12 and 13 and below the top or main deck ring member 14. The oil collection chamber member 33 may be of any desired configuration such as, for example, a truncated cone. As illustrated, the collection chamber 33 is in the form of a truncated cone having a conical body with the top and bottom edges thereof being parallel to one another. The collection chamber member 33 is in vertical alignment centrally with and vertically spaced from the bottom end of the pipe collar 21. A bottom pan element 34 is secured in horizontal relationship to the inside surface of the conical wall of the collection chamber member 33 at a point below the top surface thereof by welding or the like and defines the chamber area within which the recovered oil will be collected for subsequent withdrawal.

To secure the oil collecting chamber member 33 to the recovery unit 10, threaded studs 35 are secured at one end to the top surface of the bottom pan element 34 at spaced points therearound by welding or the like such that the threaded ends thereof will pass through an opening in each of the main bracing arm members 15, 16 and 17, and will be retained in fastened relationship thereto by means of wing nuts 36. This construction will make it possible to raise or lower the oil collection member 33 with respect to the remaining elements of the recovery unit 10 such that the top surface thereof will rest substantially at or just below the water line thereby insuring that substantially all of the material passing thereinto will be the oil to be collected.

To insure proper positioning of the recovery unit 10 in the water at the desired operating level, as well as also assisting in achieving the desired stabilization of the unit 10, suitable ballast 37 may be positioned, if desired, in the bottom of the oil collection chamber member 33. The use of such ballast 37 in the unit will insure, when needed or required, a proper seating of the unit in the water and will assist in the positioning of the oil collection chamber member 33 at the proper depth with respect to the waterline.

Figure 6:
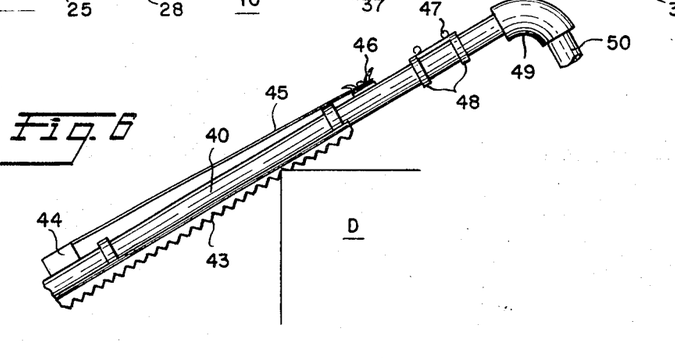
FIG. 6 is a fragmentary side elevation of one form of tubular handle means illustrating the serrated rest and other components that may be employed with the oil recovery unit made in accordance with the present invention.

Reference is now to be had to FIGS. 4-6 wherein the oil drawoff means and associated components for the operation of the recovery unit 10 is illustrated. To permit the oil taken into the collection chamber 33 to be withdrawn from the unit 10, an oil takeoff pipe 38 is positioned within the pipe collar 21 in vertically adjustable relationship. The takeoff pipe 38 is movable vertically therein such that the bottom edge thereof will rest just immediately above the surface of the bottom pan 34 in the oil collection chamber member 33. When the takeoff pipe 38 is in such a position with respect to the other elements of the recovery unit 10, it is placed in a locked position to prevent downward movement by any suitable means 38a, such as, for example, a lock screw, locking collar, or the like. The opposite end of the oil takeoff pipe 38 extends well above the pipe collar 21, and is adapted to receive one end of a flexible line or hose 39 in a close press fit.

The recovery unit 10 just described is the one that, in general, will be found to be adaptable for use in the majority of oil spillage situations. However, there are certain types of oils, such as, for example, Bunker C or extremely heavy waxy oils which are extremely difficult to draw up into a piping system by means of a suction pump. Reference is to be had now to FIG. 3 wherein a modified form of the recovery unit is shown which is particularly adaptable for the extremely heavy and difficult to pump oils. As illustrated herein, the oil collection chamber member 33 and the oil takeoff pipe 38 is provided with a water inlet pipe 33a which extends centrally through the oil collection chamber 33 and is secured in a fixed position by welding or the like to the bottom of the collection chamber 33 and the bottom pan 34, with the bottom end of the pipe extending below the bottom surface of the bottom of the oil collection chamber 33, with the upper opposite end of the water pipe means 33a extending up into the interior of the oil takeoff pipe 38. In the operation of this modified form of the oil recovery unit 10, as oil is collected in the upper area of the oil collection chamber 33 and is drawn up interiorly into the oil takeoff pipe 38, water is correspondingly drawn into the water pipe 33a and the water mixed with the oil. This operation effects a fluidization of the heavy viscous oil and enables same to be pumped readily and easily for processing to effect the separation of the oil and water subsequently and the recovery of the oil. If desired, the bottom free end of the water pipe 33a may be provided with a removable plug 33b which will be in position closing off the water pipe 33a when the lighter less viscous oils are to be recovered. When heavy, high viscous oils are to be employed, the plug will be withdrawn permitting water to be drawn up into the water pipe 33a for mixture with the heavy oil to effect a fluidization thereof. Such a recovery unit having a removable stopper for the water pipe 33a is one that could be used as an all purpose recovery unit regardless of the nature of the oil being recovered. The pipe 33a may be of a length sufficiently long to go below the oil level to insure bringing into the system only water at this point. If desired, the bottom end of the pipe 33a may be connected to an external source to bring in other fluid, hot water, steam, chemicals, or the like.

The opposite end of the flexible pipe line 39 is connected to one end of a metal tube member 40 which will serve as the handle means for locating the recovery unit 10 in the water in addition to serving as an oil passage tube. To provide the necessary support for the metal tube 40 (see FIG. 4), opposed bracing arms 41 will be secured at one end by welding or the like to collar 40a mounted to the metal tube 40 adjacent the jointure point with the flexible tube 39, with the opposite end of each of the bracing arms 41 thereof being seated in pivotal relationship in trunnion mounts 42 or like socket means secured in any suitable manner to the top circular ring means 14 at opposed points thereon. The bracing arms thus give the desired rigidity to the connection means for the recovery unit 10 and the means enabling the drawoff of the collected oil, and yet permit the unit to follow the wave motion in any up and down or lateral or inclined direction.

The recovery unit 10 made in accordance with the present invention has, as illustrated in FIG. 5, an elongated serrated rest element 43 secured to the under surface of the metal tube member 40 by ring banks, welding or the like, with the serrated edge of the rest element 43 adapted to engage and seat against the edge of a pier or dock and create a pivot point therewith, thus creating a condition equal to that, if the recovery unit 10 were gimbled. With this arrangement, when the serrated rest is in engagement with the edge of a dock, the oil recovery unit 10 may be moved over the surface of the water freely in a swinging relationship about the pivot point formed with the edge of the dock.

To facilitate the proper positioning of the unit 10 in the water when employing an assembly of the type just described, it will be found advantageous in many instances to provide a sliding weight element 44 mounted on the metal tube member 40 and is adapted to move up and down the axis of the tube in order to properly position the recovery unit 10 in the water. The weight 44 may be drawn up and down the tube member 40 by means of a line 45 secured at one end to the weight 44, with the opposite end thereof secured to a fastening post 46 mounted on the tube member 40. In many instances, it will be found unnecessary to utilize the sliding weight and under such circumstances, the weights may be eliminated.

The metal tube member 40 is provided with handle means 47 secured to the tube by any suitable means, such as, for example, locking bands 48. The handle 47 will permit an operator to stand on the dock, pier or boat and position the recovery unit 10 in any desired position, and also to swing the unit over a large area about the pivot point caused by the serrated edge of the rest and the edge of the pier or dock D. The upper end of the tube member 40 is adapted to receive a swivel, quick-coupler element 49 of conventional construction, with the opposite end of the coupler element 49 being secured to a flexible tube 50, with the opposite end of such flexible tube 50 being connected to a pump (not shown).

To collect and recover oil on the surface of the water, the recovery unit 10 is placed in the water and adjusted to the proper depth in the water by positioning the serrated edge of the rest 43 against the dock. The serrated edge of the serrated arm rest 43 is rested against the edge of the dock and due to the serrated edge tends to remain in the set state. The recovery unit 10 is now in position for operation. The vacuum pump (not shown) such as, for example, a diaphragm pump, is then placed in operation and the recovery unit 10 takes in a mixture consisting predominantly of oil and a small amount of water into the upper portion of the oil recovery chamber member 53. The oil mixture is sucked upwardly through the takeoff pipe 38, through the flexible coupling 39, the tube member 40 and into the flexible tube 50 and hence into a desired separation unit. The recovery unit 10 will, in general, remain at a fixed point on the surface of the water and will function in the manner of a vacuum cleaner, with the oil and water mixture being passed to a recovery unit where the oil and water will be separated, the oil being retained and the water discharged. As the oil-water mixture is drawn into the recovery unit 10, the barrier will be shortened or constricted to gradually decrease the area of contamination and thereby insuring also an optimum depth for the oil near the latter stages of removal.

While the form of the recovery unit made in accordance with the present invention just described utilizes a fixed positioning of the tube 40 to the dock, other tube means may be employed in which the recovery unit 10 will not be so positioned. For example, the tube member 40 need not have a serrated rest under those conditions where the unit will be moved over the water from a boat or the like, or from land or a dock where no fixed positioning of the tube is needed or required. It should also be pointed out that in many types of spillage, the oil recovery unit 10 may be positioned in the water and permitted to remain there, with oil and water being continuously withdrawn. This type of operation will be found to be advantageous in those areas where there is a continuous leakage or discharge of water occurring from a particular operation.

Figure 7:
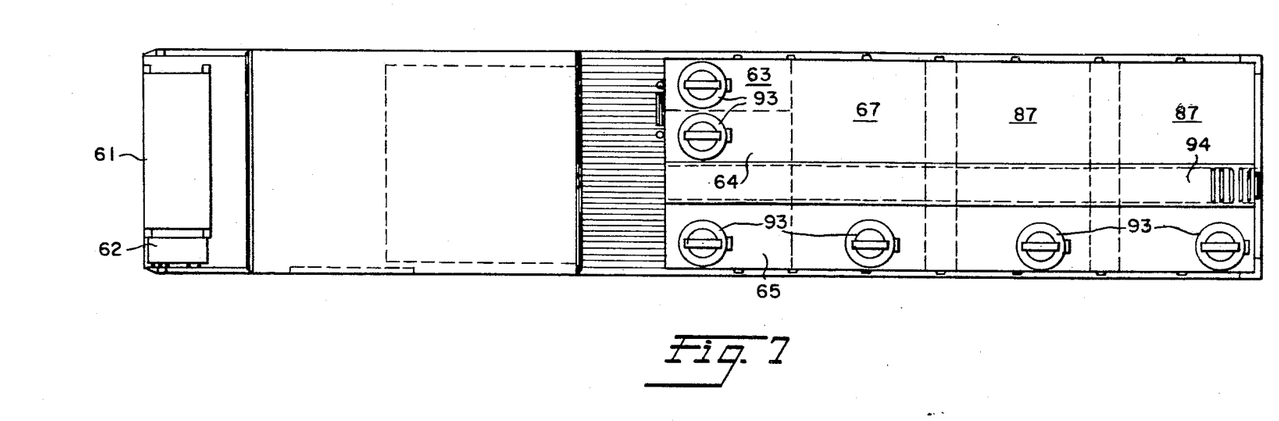
FIG. 7 is a top plan view of a trailer assembly containing the processing unit made in accordance with the present invention.
Figure 8:
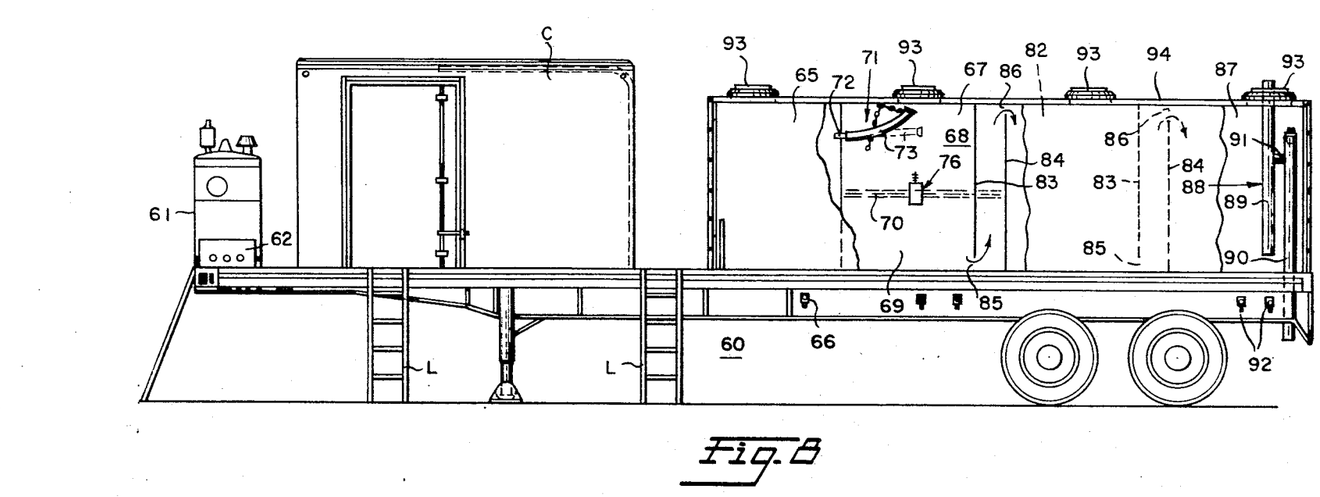
FIG. 8 is a side elevation of the trailer assembly shown in FIG. 7.

Reference is now to be had to FIGS. 7 and 8 wherein a continuously operated processing unit made in accordance with the present invention and which may be employed in association with the recovery unit 10 hereinbefore described is shown. As illustrated, the processing unit, generally designated by reference numeral 60, includes a trailer construction, generally designated by reference letter T. The trailer construction T is provided with a conventional tandem wheel assembly W and a tractor hitch H for attachment to a conventional tractor (not shown). This basic trailer construction T defines an enclosed assembly of generally conventional design, is readily movable and can be driven over the road in a conventional manner and speed to any desired point that it may be needed. Also, when required the trailer may be driven or otherwise placed aboard a barge or like water craft for use off shore.

The forward end of the trailer construction T adjacent the hitch end 11 defines a forward room having an air compressor unit 61 of any desired design and capacity, such as, for example, 160 c.f.m., fixedly mounted therein in any suitable manner. The compressor unit 61 provides the necessary power means for operating the suction pump of the one or more recovery units 10. The compressor unit 61 is provided with a compressor manifold 62 which will make it possible to connect the compressor unit 61 to the suction pump P of each of several recovery units 10, if desired or required, to permit the simultaneous operation of the pumps of several recovery units from a single power source.

Spaced rearwardly from the compressor unit 61 is a storage bank unit extending across the short side of the trailer bed T and which is divided into three storage compartments 63, 64 and 65. Storage compartment 63 contains the fuel, such as, for example, diesel fluid, to run the compressor engine, while storage compartment 64 is adapted to contain chemicals or the like which may be necessary in the operation of the recovery unit in the processing of the oil, or in final cleanup of the contaminated area. The presence of these two compartments 63 and 64, while not essential to the operation of the processing unit, however, make it possible to carry such necessary materials with the processing unit 60, thus making it completely self-contained.

The storage compartment 65 serves as the collection chamber or compartment for the recovered oil passing thereinto from the several processing stages in which the oil phase is separated from the water phase in a manner to be more fully described hereinafter. The bottom of the recovered oil storage compartment 65 has a drain valve 66 which will permit the storage compartment 65 to be drained into conventional oil storage drums or the like as it fills up.

The initial processing of the oil-water mixture collected by the one or more recovery units 10 commences by passing the mixture into a first processing chamber 67 from the discharge lines of the pumps P. In the passing of the oil-water mixture into the first processing chamber 67, a baffle, if desired, may be placed therein against which the oil-water mixture may engage to insure proper discharge. It should also be noted that where the oil to be recovered is highly volatile or has a low flash point, such oil mixture must be fed into the processing chamber 67 below the surface of the liquid present therein to eliminate static sparking. In the first processing chamber 67, the oil-water mixture will be permitted to separate into a top oil phase 68, a bottom water phase 69, and will have a thin oil-water interface 70 disposed therebetween. From the first processing chamber 67, the oil phase will be continuously fed therefrom into the forwardly positioned oil collection chamber 65 as the phase is formed, while the water phase will be carried in an opposite direction through at least two subsequent stages of settlement for discharge back into the water, or otherwise disposed of. This processing thus will eliminate completely the presence of any material amount of water in the recovered oil.

Figure 9:
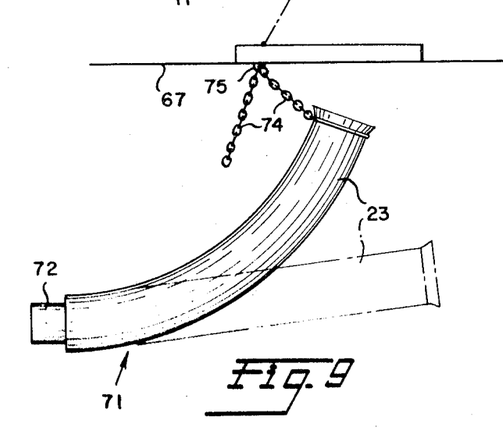
FIG. 9 is an enlarged side elevational view of one form of an oil drain pipe for transferring oil to the recovery zone of the processing unit shown in FIGS. 7 and 8.

To draw off the oil phase 68, a drawoff pipe assembly 71, as illustrated specifically in FIG. 9, is located between the upper areas of the collection chamber 65 and the first processing chamber 67. The drawoff pipe assembly 71 includes a pipe nipple 72 extending between the bulkhead wall dividing the first processing chamber 67 and the collection chamber 65 adjacent the top thereof. A flexible pipe 73 is connected at one end to the end of the nipple 72 extending into the first processing chamber 67 and is of a length sufficient to permit same to be raised or lowered therein with the rise and fall of the level of the oil phase 68. To lock or retain the free end of the flexible pipe 73 in any given position and yet permit its ready adjustment consistent with the level of the oil phase, a chain 74 is connected at one end to the fee end of the flexible hose 73. The chain 74 may be positioned at any point therealong by engagement of same with a hook 75 secured to the top of the first processing chamber 67. It is to be clearly understood that the drawoff pipe assembly 71 just described is illustrative in character only and there are other means and modes readily available by which the oil phase 68 may be carried to the collection chamber 65, regardless of its surface level.

Figure 10:
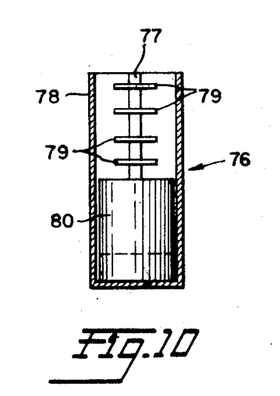
FIG. 10 is a side elevation of one form of an interface float that may be employed in the processing unit shown in FIGS. 7 and 8.

To provide means for determining the oil phase level, an interface float, generally designated by reference numeral 76 and disclosed specifically in FIG. 10, may be positioned in the first processing compartment 67. The interface float 76 may be of any desirable construction which will sink in oil and float on water, and which will provide a gauge indication of the height or depth of the oil phase level. As illustrated, the interface float 76 comprises a plurality of vertical tubular guide members 78 having a graduation element 79 in inches secured thereto in vertical relationship. A float cylinder 80 is mounted within the tubular chamber 78 for vertical movement therein. The float cylinder 80 is mounted with the guide member for movement therealong in a vertical plane and will rise in water and sink in oil such that the float will remain substantially at the oil-water interface 70, with the graduation element 79 of the interface float 76 being positioned in the oil phase 68. This construction enables an operator to readily determine visually the number of inches of oil present in the collection chamber 67 at any given time.

Positioned rearwardly of the first processing chamber 67 and adjacent thereto is a second processing chamber 82 into which water from the water phase 79 will pass in a tortuous path and at a slow velocity. To achieve this passageway between the first and second processing chambers, laterally spaced vertical partitions are provided between the first and second processing chambers 67 and 82, respectively. Such partitions, as illustrated, are in the form of laterally spaced, vertically disposed bulkhead walls 83 and 84, with the wall 83 adjacent the processing chamber 67 extending downwardly from the inner top surface of the first processing chamber 67 and stopping short of the floor thereof defining a horizontally disposed bottom passageway 85 therebetween. The second bulkhead wall 84 is spaced rearwardly from the first bulkhead wall 83 and extends upwardly from the floor of the first processing chamber 67 and stops short of the top surface of the second processing chamber defining a horizontally disposed, top passageway 86 therebetween. The bulkhead wall construction just described will cause the water phase 69 to pass through the bottom passageway 85 at the bottom of the first processing chamber 67 and into the formed vertical passageway between the bulkhead walls 83 and 84, and then upwardly and outwardly into the second processing chamber 82 through the horizontally disposed top passageway 86.

A third processing chamber 87 is spaced rearwardly from the second processing chamber 82 and is separated therefrom by means of vertical bulkhead walls 83 and 84 which are of identical construction and configuration as the bulkhead walls 83 and 84 separating the first and second processing chambers 67 and 82. The third processing chamber 87 functions in the same manner as the second processing chamber to further aid in the separation of any oil from the water phase and to insure the passage of the water at a low velocity through the unit until discharged. The need for this construction just described is to insure that the water will move at a very low velocity toward the discharge end of the processing unit and by reason of such slow movement of the water insures a substantially complete separation of the oil-water mixture into the desired oil and water phases 68 and 69. Such construction further insures that any oil entrained in the water phase 69 as it passes through to discharge will be deposited at the top surface of the next stage of the water phase where it will remain.

To facilitate the removal of the water phase 69 substantially free of any oil from the third processing chamber 87, a drawoff unit, generally designated by reference number 88, is positioned in the third processing chamber 87. The water drawoff unit, as illustrated, comprises a first vertical stand pipe 89 extending through the top of the third processing chamber 82 to a vent opening at the top thereof and well down into the third processing chamber 87 but stopping short of the bottom thereof. A second vertical stand pipe 90 is connected to the first stand pipe 89 adjacent the upper portion thereof by means of a horizontal pipe nipple 91. The second vertical stand pipe 90 extends downwardly through the floor of the third processing chamber 87 and forms the discharge outlet for the water phase 89 from the processing unit. As illustrated, the second vertical stand pipe 90 is provided with a drain valve 92. This stand pipe assembly construction 88 just described makes it possible to maintain a continuous drain off of water from the third or processing chamber 87 at a low velocity and will permit the water to be discharged back into the water or to some other location convenient thereto. The drawoff assembly 88 by means of the location of the connecting pipe nipple 91 between the stand pipes 89 and 90 will insure a level of water in the final processing chamber and hence throughout the processing chambers at least equal to the distance between the pipe nipple 91 and the floor of the processing chamber 87.

It is to be understood that while there have been three processing chambers 67, 82 and 87 shown, the number of processing units is illustrative in character only and the processing unit of the present invention is not to be limited to any numerical number of processing chambers. To the contrary, the system may utilize a greater number of processing chambers if same are needed or desired. It is also to be clearly understood that the stand pipe assembly 88 described hereinbefore is illustrative in character only of one form of means that may be associated with the third or final processing chamber to enable the water phase to be discharged from the processing unit 60. There are readily available other means that may be employed to achieve the maintenance of fluid level and the discharge of the water phase and such means are included within the spirit and scope of the present invention.

As is shown in FIGS. 7 and 8, the fluid storage compartments 63 and 64, the oil collection chamber 65 and the three processing chambers are provided with an opening at the top of each end thereof covered by a detachable cover member 93, preferably hinged to its respective compartment. To provide ready access to each of the top compartment openings, an overhead catwalk 94 is mounted along the top of the processing unit 60 with a ladder 96 secured at the rear of the trailer for access thereto. By this construction ready entrance to each of the compartments is provided for cleaning same, filling same, or for taking out collected material. For example, the top opening in the first processing chamber 67 may be the means by which the oil-water mixture is fed into the processing unit 60, although it is preferred that feed lines for the compartment 67 be provided which can be detachably connected to the discharge end of the oil-water discharge line of the suction pump. Moreover, it is desirable that in the startup of the processing unit 60, each of the processing chambers should first be filled with water to start an immediate drain-off of water from the final processing compartment at a slow velocity. Under such circumstances, with this type of construction each of the processing compartments can be readily and quickly filled with water immediately through its respective top opening. Furthermore, entrained oil carried by the water phase during the operation of the processing unit 60 will tend to float at the top surface of each of the second and subsequent stages and such oil can be removed through the top opening of each compartment. It should also be noted that while bottom drain or drawoff means are shown for certain compartments, bottom drain means will normally be provided for each compartment to permit individual emptying of same when desired.

The illustrative embodiment of the processing unit 60 just described is shown as being a unitary structure having a plurality of walls or bulkheads present therein defining and forming the desired compartments. While this is the preferred mode of construction for reasons of compactness, portability and ease of operation, it is to be clearly understood that such compartments may be, if desired, individual units interconnected with one another, where needed, by suitable piping, tubing, or the like. In such a form, it should be noted that such interconnected compartments should be so connected and constructed that the water phase will still move continuously through each compartment at a low velocity. In the illustrative trailer construction T, the forward end thereof is provided with an enclosed cabin or service module C having side and rear doors therein which will function as an operation or service room when the processing unit 60 is in use and a storage room for recovery units, pumps, lines and other recovery equipment when not in use.

Figure 11:
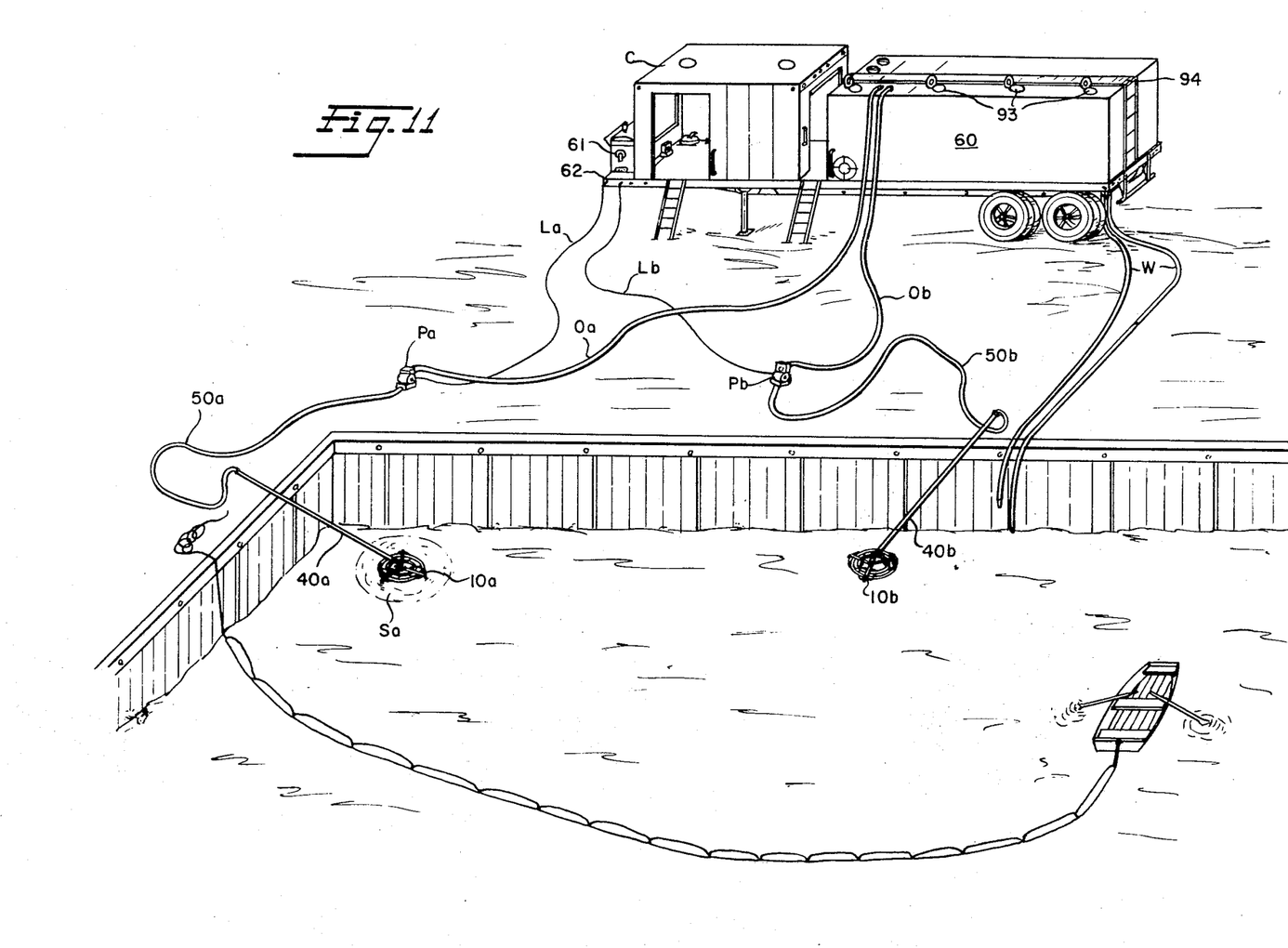
FIG. 11 is a perspective view of oil recovery units made in accordance with the present invention shown in use with a processing unit made in accordance with the present invention.

Reference is now to be had to FIG. 11 wherein two recovery units made in accordance with the present invention are shown in operation, with the processing unit made in accordance with the present invention for the removal of an area of oil slick confined on two sides by a dock area. In this embodiment of the use of the recovery processing unit of the present invention, the processing unit 60 is driven to the site of the oil spillage by a tractor and parked as close as possible to the oil polluted area of water. A floating oil barrier B is then secured at one end to the dock and the other end connected to a rowboat R. The barrier B will be so positioned that it will surround the outside perimeter of the oil slick, thereby confining same within the barrier area and the dock side area. It should be noted that as the oil is picked up from the surface of the water and the area of pollution diminishes, the boom or barrier B will be pulled in or shortened thereby gradually reducing the enclosed area of pollution and at the same time maintaining a sufficiently high level of oil on the water surface so that the oil can be recovered efficiently. The shortening or restriction of the boom or barrier B will continue until substantially all of the oil has been removed. It should be noted that in the event the oil spillage occurs in an area where there is no land or land located barrier, such as a dock or a pier, the entire oil slick or that much of which will not engage against or be confined by a natural or man made barrier will be enclosed by floatable boom or barrier B. This will likewise be true where the oil slick occurs off shore and the processing unit 60 is transported to the area of contamination by a barge or like vessel.

After the barrier B has been properly placed and the polluted area of oil spillage confined by such barrier, a suitable number of recovery units 10 are placed at desirable points on the surface of the oil contaminated area. As illustrated in FIG. 11, two recovery units 10 are employed, these being designated 10a and 10b, with a floating screen Sa surrounding the recovery unit 10a. The floating screen Sa is independent of the recovery unit 10a and serves to keep debris and the like from being carried into the area in which the recovery unit 10a is placed. With this type of floating screen Sa, the recovery unit 10 may or may not have a barrier screen 32 surrounding the outside periphery thereof. The recovery unit 10b as illustrated does not have a floatable barrier screen surrounding the area thereof and under such circumstances the recovery unit 10b would normally have a barrier screen 32.

With the positioning of the recovery units 10a and 10b in the desired area of recovery, the tube members 40a and 40b of each of the recovery units 10a and 10b, which constitute the handle means for the positioning of the recovery units in the water, will be positioned in place with the serrated edge of the rest element 43 of each tube member 40a and 40b engaging the dock edge at a point which will properly locate with recovery units 10a and 10b in the water such that the oil collection chamber 33 of each unit will lie at or just below the waterline. This placement of the tube member will form a pivot point for each unit on the dock D about which the recovery units 10a and 10b will pivot laterally or move up and down with the rise and fall of the water level. The sliding weight 44, if need be, may be moved up or down the tube member 40 to further aid in insuring the proper location depthwise of the recovery units 10a and 10b in the water.

Upon the placement of the recovery units 10a and 10b on proper position on the dock D, quick coupler elements 49a and 49b are connected at one end to the upper end of each of the tube members 40a and 40b respectively, with the opposite end thereof connected to flexible tubes 50a and 50b respectively. The opposite ends of the flexible tubes 50a and 50b of the recovery units 10a and 10b respectively are connected, in turn, to diaphragm pumps Pa and Pb respectively, such diaphragm pumps Pa and Pb being driven respectively through air lines La and Lb operatively connected to the manifold 62 of the air compressor 61 mounted on the bed of the trailer T. The suction pumps Pa and Pb are connected at their respective discharge ends to oil-water mixture discharge lines Oa and Ob respectively, with the free ends of the discharge lines Oa and Ob being coupled to an inlet feed manifold or feed lines of the first processing compartment 67. Water lines W are operatively coupled to a discharge manifold connected to the discharge valve 92 of the final stage processing compartment 87. The opposite ends of the water lines W are dropped over the side of the dock so that the water phase from the processing unit 60 may be discharged back into the water. Each of the processing compartments 67, 82 and 87 is then filled with water which may be accomplished by the use of a pump in which the water outside the polluted area is pumped into the processing compartments.

Other accessory units may be placed in position for operation, if needed, such as, for example, floodlights, cleanup lines, chemical feed lines, and the like. While it has not been shown, it will be found desirable for most general purposes to utilize a suction strainer element of conventional design in the feed lines 50a and 50b respectively as a final check to insure that the oil-water mixture taken from the recovery units 10a and 10b will be free from small foreign particles. With these associated elements in position, the removal of the oil slick can be now carried out.

The oil recovery and processing operation is commenced by starting the compressor 61 which sets into operation the suction pumps Pa and Pb which will impose a suction through tube means 40 and oil takeoff line 38 on the oil collection chamber 33 of each of the respective units 10a and 10b. This imposed suction by pumps Pa and Pb will result in a mixture being drawn thereinto which consists predominantly of oil and to some extent a small amount of water, dependent upon the oil-water interface. The oil-water mixture passes up through the respective tube means 40a and 40b, through flexible lines 50a and 50b, then through the pumps Pa and Pb, and hence through the oil discharge lines Da and Pb and finally into the first processing compartment 67. The outlet drain 92 of the final processing compartment 87 is open causing the water in the compartments 67, 82 and 87 to be discharged through line W back into the water. This feed and recovery operation is on a continuous basis and as oil is sucked up through the tube members 40a and 40b, the oil in the adjacent area of pollution will tend to replace the oil taken up in this manner. As this suction effect and oil removal continues, the barrier B may be shortened to the same extent thereby insuring a proper oil depth for easy removal in the manner hereinbefore described.

The oil-water mixture passing into the compartment 67 through the oil discharge lines Oa and Ob achieves a continuous stratifying or separation within the first processing compartment 67 into an oil phase 68, a water phase 69, and an oil-water interface 70. The oil phase will pass through the oil takeoff line 71 into the oil recovery compartment 65 continuously where the collected oil in the compartment can be drained periodically therefrom by passing same into oil containers through drain valve 66. The water phase will pass in a tortuous up and down path and at a slow velocity through compartments 82 and 87 causing any entrained oil to collect at the top surface of each of the second and third processing compartments 82 and 87 where same may be removed by skimming or the like. The continuously moving water phase will be drawn off through the drain 92 in lines W from the final processing chamber 87 by means of the syphon and water drawoff unit 87. In the drawoff operation, the water phase passes upwardly through the first vertical stand pipe 89 through the horizontal pipe nipple 91 into the second vertical stand pipe 90 which is operatively connected at its lower end to the discharge valve unit 92.

This system is permitted to run on a continuous operation basis until substantially all of the oil constituting the oil slick has been picked up by the respective recovery units 10a and 10b and passed through the processing unit 60 wherein the oil is recovered for reuse and the water discharged back into the areas of pollution. Upon the completion of the removal of the oil, the diaphragm pumps are shut down and the processing unit 60 drained of any residual material. The floating barrier B is then removed and the area of pollution, which has now been freed of oil, is subjected to any necessary clean up by use of chemicals or the like. The portable processing unit 60 may then be loaded with all of the recovery units, pumps, and associated lines and equipment, and then driven from the area for service at some other location.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A portable oil recovery unit controllable as to depth of submergence and freely movable over the surface of a body of water for removal of oil present on the surface of the water comprising a plurality of float elements having a decreasing volume from the top downwardly to aid in the maintenance of the unit at a selected depth of submergence in the water, said float elements being associated with one another in circumferentially spaced relationship defining frame means, oil collection chamber means positioned centrally within the defined frame means with respect to the center of buoyancy of said unit and below the top surface of said float elements, oil drawoff means operatively connected at one end to said oil collection chamber means for withdrawing the oil upwardly from said chamber with the opposite end thereof adapted to be operatively connected to pump means positioned remote to the recovery unit for drawing off oil present in said collection chamber means, means substantially rigid throughout the major portion of its length for positioning and maintaining said unit at a selected substantially fixed vertical depth in the water such that access to said oil collection chamber means will be maintained substantially at or just below the surface of the oil and water, and connecting means associated with said positioning and maintaining means for engagement with the edge of a dock, boat or the like to fix said positioning and maintaining means at a selected set point and to permit movement of the unit about the engagement point and to allow for control of depth of submergence of the unit by changing the point of engagement thereof.

2. An oil recovery unit in accordance with claim 1, wherein horizontally disposed deck means are mounted on said unit at a point below the bottom end of said oil collection chamber means, said deck means being so constructed and arranged to impart substantially imperforate surfaces therewith thereby imparting a stabilizing effect thereto.

3. An oil recovery unit in accordance with claim 1, wherein strainer means are disposed around the periphery of the frame means to entrap debris and the like.

4. An oil recovery unit in accordance with claim 1, wherein water pipe means are vertically positioned within said oil collection chamber means and said oil drawoff means with the bottom end of said pipe means being connected to a fluid source whereby fluid will be brought into said oil drawoff means for fluidizing the collected oil.

5. An oil recovery unit in accordance with claim 1, wherein ballast means are carried by said oil collection chamber means.

6. An oil recovery unit in accordance with claim 1, wherein frame means forming a ring-shaped top deck means are secured to the top surface of said float elements forming a circumferentially extending top deck.

7. An oil recovery unit in accordance with claim 1, wherein said oil collection chamber means include a body member having a transversely disposed bottom pan element intermediate its top and bottom surfaces defining the area in which the oil will be collected.

8. An oil recovery unit in accordance with claim 6, wherein support means are connected to said frame means in horizontally disposed relationship, said support means converging inwardly toward one another and being operatively connected to said oil drawoff means.

9. An oil recovery unit in accordance with claim 8, wherein said oil drawoff means include collar means connected to said support means at their point of convergence, rigid pipe means positioned in said collar means for vertical movement therein, and means for locking said rigid pipe means in a fixed position.

10. An oil recovery unit in accordance with claim 8, wherein adjusting means are positioned between said support means and said oil collection chamber means to permit the vertical adjustment of said collection chamber means.

11. An oil recovery unit in accordance with claim 1, wherein said oil drawoff means and said means for positioning the unit in the water are the same, with the resulting formed assembly also constituting handle means to enable the movement and placement of the oil recovery unit at any desired point within the contaminated area.

12. An oil recovery unit in accordance with claim 1, wherein said connecting means comprises serrated rest means secured to the under surface of said positioning and maintaining means for engagement with the edge of a dock, boat or the like to fix said positioning and maintaining means at a set point and to permit movement of the unit about the engagement point and to allow for control of depth of submergence of the unit by changing the point of engagement.

13. An oil recovery unit in accordance with claim 11, wherein weight means are positioned on said handle means in sliding relationship therewith for adjusting the depth of the recovery unit in the water.

14. An oil recovery unit in accordance with claim 1, and further including frame means forming ring-shaped, top deck means secured to the top of said float elements, support means connected to said frame means in horizontally disposed relationship, said support means converging radially inwardly to a jointure point centrally of said top deck means, oil collection chamber means positioned centrally with respect to said unit and below the top surface of said float elements, stabilizing bottom deck means connected in a horizontal plane to said support means in vertically spaced relationship from said oil collection chamber means, a rigid, vertically disposed pipe element positioned at said jointure point of said support means with the lower end extending into said oil collection chamber means and the upper end extending above said float elements, and oil drawoff pipe means positioned at one end to the upper end of said rigid pipe element.

15. An oil recovery unit in accordance wit claim 14, wherein a plurality of secondary support means are secured to said top deck means in radially spaced relationship and to said bottom deck means.

16. An oil recovery unit in accordance with claim 15, wherein strainer means are secured to the outside surface of the secondary support means and extend circumferentially around the area between the top deck means and the bottom deck means.

17. An oil recovery unit in accordance with claim 14, wherein said float elements are in the form of a cone and the oil collection chamber means are in the form of a truncated cone.

18. An oil recovery unit in accordance with claim 17, wherein said oil collection means includes ballast means in the bottom thereof.

* * * * *